US008082303B2

(12) United States Patent
Laroia et al.

(10) Patent No.: US 8,082,303 B2
(45) Date of Patent: Dec. 20, 2011

(54) METHODS AND APPARATUS FOR COMBINED PEER TO PEER AND WIDE AREA NETWORK BASED DISCOVERY

(75) Inventors: Rajiv Laroia, Far Hills, NJ (US); Junyi Li, Chester, NJ (US); Vincent D. Park, Budd Lake, NJ (US); Ying Wang, Easton, PA (US); Aleksandar Jovicic, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 12/413,877

(22) Filed: Mar. 30, 2009

(65) Prior Publication Data

US 2010/0250673 A1    Sep. 30, 2010

(51) Int. Cl.
*G06F 15/173* (2006.01)
(52) U.S. Cl. ........ 709/204; 709/205; 709/206; 709/224; 370/260
(58) Field of Classification Search ........................ None
See application file for complete search history.

(56) References Cited

U.S. PATENT DOCUMENTS

| | | | | |
|---|---|---|---|---|
| 6,123,259 | A * | 9/2000 | Ogasawara | 705/14.58 |
| 6,236,330 | B1 * | 5/2001 | Cohen | 705/14.58 |
| 7,103,370 | B1 * | 9/2006 | Creemer | 705/14.58 |
| 7,382,260 | B2 | 6/2008 | Agarwal et al. | |
| 7,593,721 | B2 * | 9/2009 | Ratnakar | 705/14.58 |
| 2005/0174962 | A1 | 8/2005 | Gurevich | |

FOREIGN PATENT DOCUMENTS

| | | |
|---|---|---|
| EP | 1641183 | 3/2006 |
| KR | 100701009 | 3/2007 |

OTHER PUBLICATIONS

Mzila, PD et al. "A service supplier database for location-based mobile commerce." 27th International conference on distributed computing systems workshops. IEEE, 2007. 6 pages.*
Varshney, Upkar. "Location Management for Mobile Commerce Applications in Wireless Internet Environment." ACM Transactions on Internet Technology. ACM, vol. 3, No. 3. Aug. 2003. 236-55.*
NNRD 434156. "Definition and marketing of mobile phone or vehicle tracking informaiton containing an average daily commute database." IBM Technical Disclosure Bulletin. Jun. 2000. UK. Issue 434, p. 1140.*
International Search Report and Written Opinion— PCT/US2010/028410, International Searching Authority—Korean Intellectual Property Office, Nov. 2, 2010.

* cited by examiner

*Primary Examiner* — Jeffrey R Swearingen
(74) *Attorney, Agent, or Firm* — James K. O'Hare

(57) ABSTRACT

A first wireless communications device includes a wide area network (WAN) interface and a peer to peer interface. The first device discovers the presence of a second wireless communications device via a peer discovery signal, received via its peer to peer interface. The second device has been transmitting, e.g., periodically, certain information, e.g., its location and/or shopping preferences, to a node within the WAN. The detected first signal triggers an application alert in the first device. The first device recovers past information about the second device through a second signal received via its WAN interface. The first device uses information communicated in the first signal, e.g., device identifier information, and information communicated in the second signal, e.g., past location and/or shopping information, to generate a targeted message for the second device. The first device communicates the targeted message via its peer to peer interface in a peer to peer traffic channel.

22 Claims, 8 Drawing Sheets

METHODS AND APPARATUS FOR COMBINED PEER TO PEER AND WIDE AREA NETWORK BASED DISCOVERY

FIELD

Various embodiments relate to wireless communications, and more particularly, to methods and apparatus which can be used in a system which supports both peer to peer signaling and wide area network signaling.

BACKGROUND

In the field of wireless communications there has been a trend to make available and utilize spectrum for additional types of networks in addition to conventional cellular networks. One such network type which has been gaining in popularity and utilization is a peer to peer network in which communications occur in a relatively local vicinity.

Many modern wide area networks, e.g., cellular networks, routinely collect certain types of information regarding its registered users, e.g., as part of normal network control operations. For example the location or approximate location of registered users in the system may be tracked as part of normal system maintenance, e.g., for scheduling and/or load balancing purposes. The wide area networks may also be well suited for collecting and/or distributing other types of information about its registered users which may be of interest to others.

Peer to peer networks may have various advantages over cellular networks. For example, peer to peer networks may be well suited to perform efficient proximity detection in a local vicinity. Peer to peer networks may be well suited to communicate small amounts of payload information directly with low overhead. While peer to peer communications can provide satisfactory local information, it may be desirable for peer to peer devices to be able to obtain information corresponding to a larger geographic region than can be reached by direct peer to peer signals and/or historical information about device location or preferences that may be stored in a wide area network accessible device.

Based on the above discussion there is a need for new methods and apparatus that can utilize, in combination, both peer to peer and wide area networks and take advantage of features inherent in each type of network.

SUMMARY

Methods and apparatus related to implementing and utilizing two interfaces, e.g., a peer to peer network interface and a wide area network interface, in a wireless communications device are described. In some peer to peer networks, devices can monitor for and discover each others presence in a local vicinity, e.g., using peer discovery signals communicated during peer discovery intervals. The same devices can be concurrently registered with a wide area network and can transmit, e.g., periodically transmit, certain information into the WAN network, e.g., location information and/or shopping preference information, for storage, processing, tracking and/or aggregation. Certain applications running on the wireless devices can recover and utilize relevant information resident in the WAN network in generating a targeted message for a particular node of interest which has been discovered through the peer to peer interface. Thus certain applications running on devices including both a WAN and peer to peer interface can utilize combined WAN interface received information and peer to peer interface received information to generate a targeted message. In some embodiments, the generated targeted message is communicated via the peer to peer interface.

An exemplary embodiment with now be described. A first exemplary wireless communications device includes, in one embodiment, a wide area network (WAN) interface and a peer to peer interface. The first device discovers the presence of a second wireless communications device via a peer discovery signal, received via its peer to peer interface. The second device has been transmitting, e.g., periodically transmitting, certain information, e.g., its location and/or shopping preferences, to a node within the WAN. The detected first signal triggers an application alert in the first device. The first device recovers past information about the second device through a second signal received via its WAN interface. The first device uses information communicated in the first signal, e.g., device identifier information and/or current location information, and information communicated in the second signal, e.g., past location, past routing, and/or shopping information, to generate a targeted message for the second device. The first device communicates the targeted message directly to the second device via its peer to peer interface in a peer to peer traffic channel. The targeted message is, e.g. one of an advertisement related information and routing related information.

An exemplary method of operating a first communications device, in accordance with some embodiments, comprises: receiving a first signal from a second communications device; generating a first application alert if said first signal satisfies an application alert criteria; and receiving a second signal from an access point said second signal carrying second communications device information based on a previous signal from the second communications device. An exemplary first communications device, in accordance with some embodiments, includes at least one processor configured to: receive a first signal from a second communications device; generate a first application alert if said first signal satisfies an application alert criteria; and receive a second signal from an access point said second signal carrying second communications device information based on a previous signal from the second communications device. The exemplary first communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
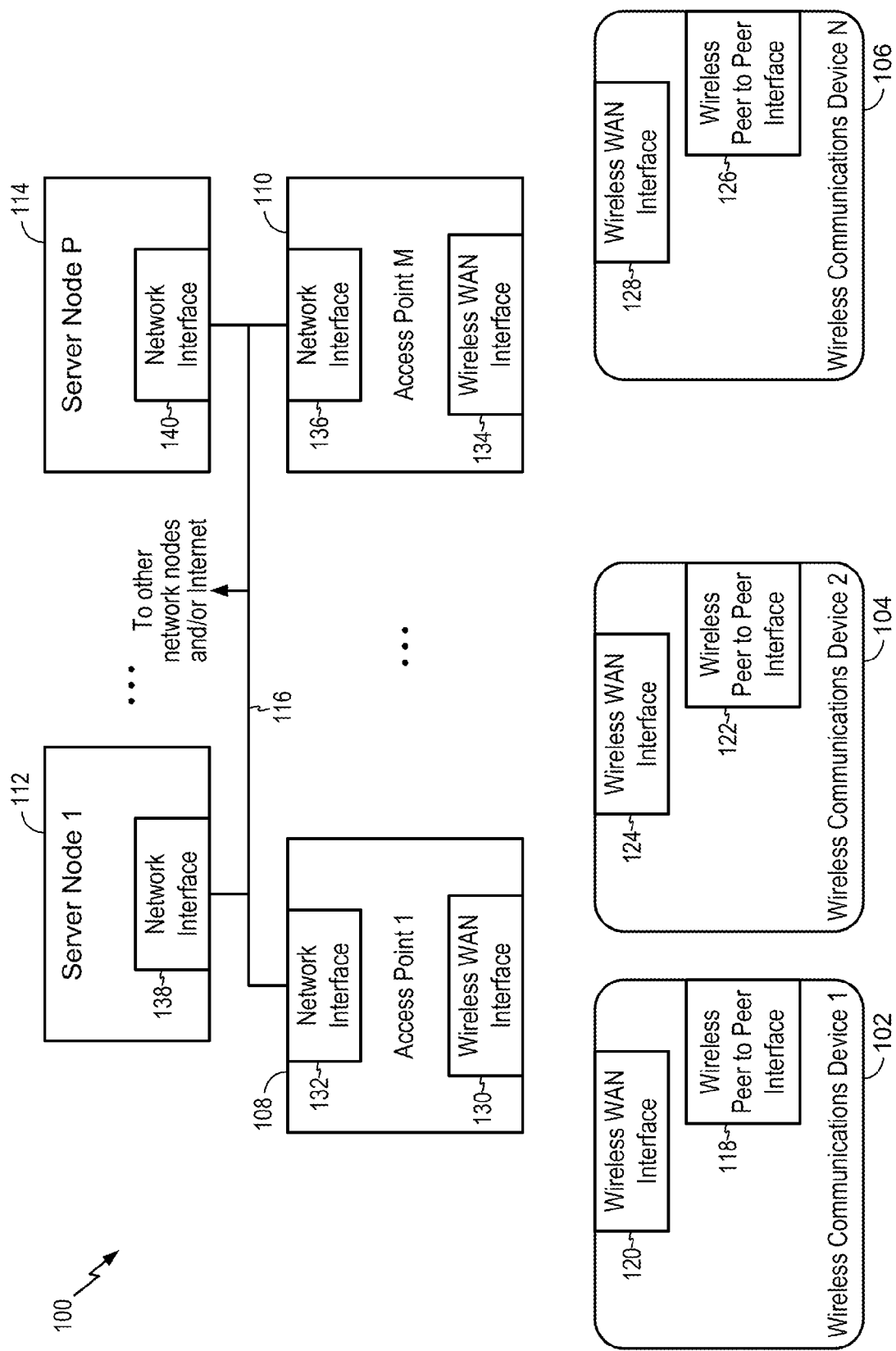
FIG. 1 is a drawing of an exemplary communications system including a plurality of wireless communications device with both a wide area network interface and a peer to peer interface, a plurality of access points, and a plurality of server nodes.

FIG. 1 is a drawing of an exemplary communications system 100 including a plurality of wireless communications device (wireless communications device 1 102, wireless communications device 2 104, . . . , wireless communications device N 106), a plurality of access points (access point 1 108, . . . , access point M 110), and a plurality of server nodes (server node 1 112, . . . , server node P 114). The exemplary wireless communications devices (102, 104, 106) include wireless peer to peer interfaces (118, 122, 126), respectively, and wireless wide area network interfaces (120, 124, 128), respectively.

The exemplary access points (108, 110) include wireless wide area network interfaces (130, 134), respectively, and network interfaces (132, 136), respectively. The exemplary server nodes (112, 114) include network interfaces (138, 140). The exemplary network interfaces (132, 136, 138, 140) are coupled together via a backhaul network 116 which couples the nodes (108, 110, 112, 114) together and to other network nodes and/or the Internet.

In some embodiments at least some of access points (108, . . . , 110) are base stations. In some embodiments, at least one of the server nodes (112, 114) is used to store and/or track location information regarding at least some of the wireless communications devices (102, 104, . . . , 106). In some embodiments, at least one of the server nodes (112, 114) is used to store and/or track shopping preference information regarding at least some of the wireless communications devices (102, 104, . . . , 106).

The wireless wide area network interfaces (120, 124, 128, 130, 134) are, in some embodiments, part of a cellular network. The wireless peer to peer interfaces (118, 122, . . . , 126) in some embodiments use device to device signaling. In some embodiments, wireless communications over the cellular network use one of CDMA based wireless signaling and GSM based wireless signaling, and the wireless communications over the peer to peer interfaces use OFDM based wireless signaling. In some embodiments, the maximum signaling range for the peer to peer interface signaling is less than the maximum signaling range for the wide area network interface signaling.

The wireless communications devices (102, 104, . . . , 106) include stationary and mobile wireless communications devices. Exemplary mobile wireless communications devices includes cell phones with peer to peer capability and laptop computers with peer to peer capability, and other types of wireless communications devices including both a wireless WAN interface and a peer to peer interface. The access points (108, . . . , 110) include fixed location base stations.

Figure 2:
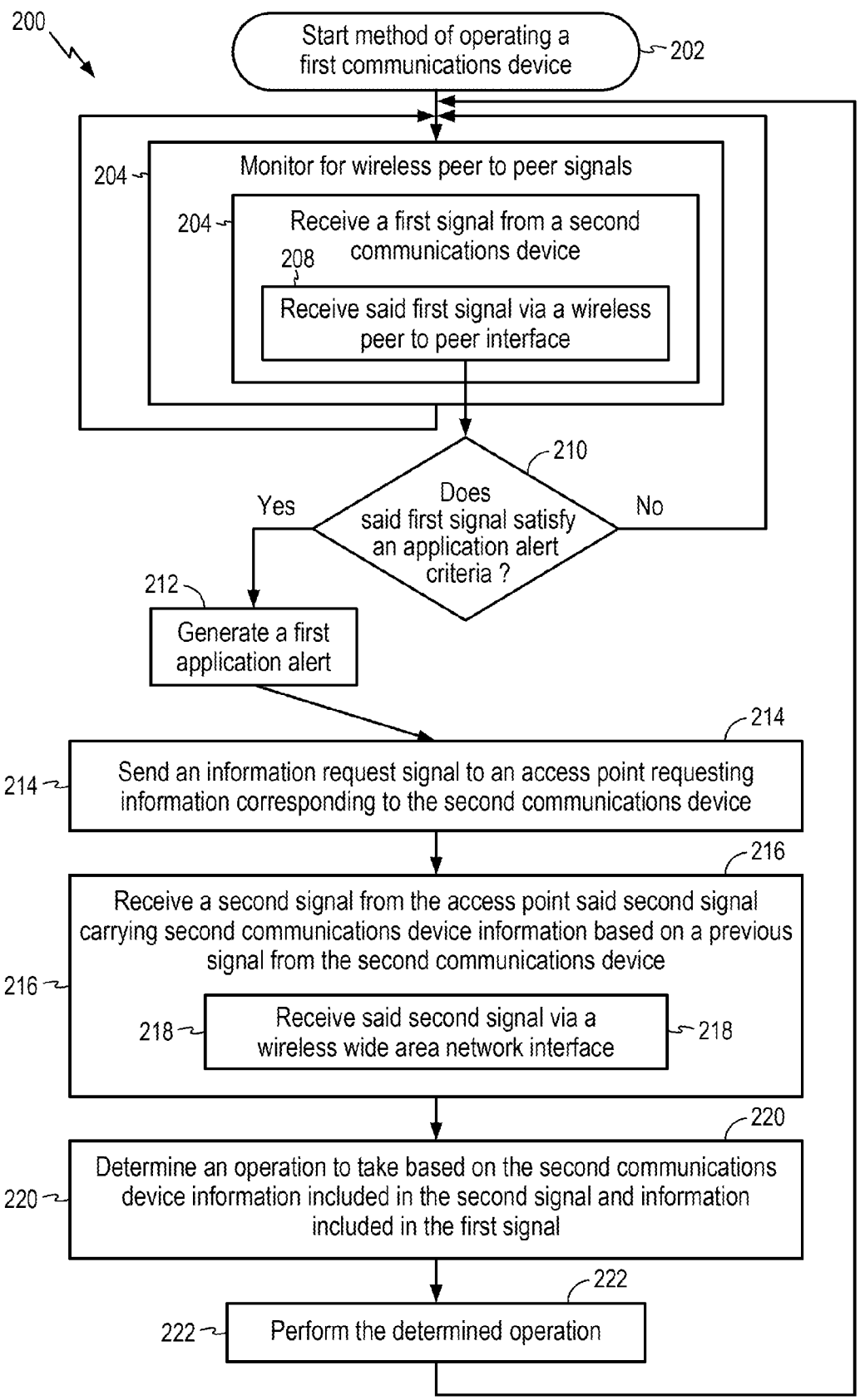
FIG. 2 is a flowchart of an exemplary method of operating a first communications device in accordance with an exemplary embodiment.

FIG. 2 is a flowchart 200 of an exemplary method of operating a first communications device in accordance with an exemplary embodiment. The exemplary first communications device is, e.g., one of the wireless communications devices (102, 104, . . . , 106) of FIG. 1. Operation starts in step 202, where the first communications device is powered on and initialized. Operation proceeds from start step 202 to step 204.

In step 204, the first communications device monitors for wireless peer to peer signals. Step 204 is performed on a recurring basis. Step 204 includes step 206, in which the first communications device receives a first signal from a second communications device. The first signal is, e.g., a peer discovery signal. Step 206 includes step 208 in which the first communications device receives said first signal via a wireless peer to peer interface. The wireless peer to peer interface is, e.g., a direct device to device communications interface. In some embodiments, the wireless peer to peer interface uses a peer to peer signaling protocol.

Operation proceeds from step 206 to step 210. In step 210 the first communications device determines whether or not the received first signal satisfies an application alert criteria. If the received first signal does not satisfy the application alert criteria, then operation proceeds from step 210 to the input of step 204 for additional monitoring. However, if the received first signal does satisfy the application alert criteria, then operation proceeds from step 210 to step 212. In step 212 the first communications device generates a first application alert.

Operation proceeds from step 212 to step 214. In step 214 the first communications device sends an information request signal to an access point, e.g., a base station, requesting information corresponding to the second communications device. In some embodiments, step 214 is not included and operation proceeds from step 212 to step 216. For example, in one such example, the access point sends, e.g., periodically transmits, information about the second communications device.

In step 216 the first communications device receives a second signal from the access point, said second signal carrying second communications device information based on a previous signal from the second communications device. In some embodiments, the second communications device information carried by the second signal is second communications device location information. In some embodiments, the second communications device information carried by the second signal is second communications device shopping preference information. Step 216 includes step 218 in which the first communications device receives said second signal via a wireless wide area network interface. In some embodiments, the wireless wide area network interface is a cellular network interface. In some embodiments, the wide area network interface uses a cellular communications protocol. In one exemplary embodiment, the wireless peer to peer interface is an OFDM interface and the wireless wide area network interface is a CDMA interface. In one exemplary embodiment, the wireless peer to peer interface is an OFDM interface and the wireless wide area network interface is a GSM interface.

Operation proceeds from step 216 to step 220. In step 220 the first communications device determines an operation to take based on the second communications device information included in the second signal and information included in the first signal. Then in step 222 the first communications device performed the determined operation of step 220. In some embodiments the application receiving the first application alert takes the determined action. Operation proceeds from step 222 to the input of step 204 for additional monitoring.

In some embodiments, the information included in the first signal used in determining the operation to take includes second communications device identifier information. In some embodiments, the information included in the first signal used in determining the operation to take includes second communications device identifier information plus additional second device information, e.g., second device current location information.

In one exemplary embodiment, the second communications device information included in the second signal is information on a previous location of the second communications device, the information included in the first signal is current location information regarding the second communications device, and the operation is one of a location based traffic update operation and a location based advertisement operation. For example, a traffic or advertising update operation may be based on both the previous location and the current location. In some embodiments, the operation is also based on date and/or time association with location information. For example, a traffic update may be for an anticipated route based on a previously taken route at the same time of day. As another example, an advertisement update may be based on a previous route taken at the same time of day, e.g., based on previous shopping habit information.

In some exemplary embodiments, the operation performed includes transmitting information from the first communications device to the second communications device via the first communications device peer to peer interface over a peer to peer traffic channel air link resource. In some such embodiments, the information communicated over the peer to peer traffic channel is retail marketing information, e.g., a coupon advertisement. In some such embodiments, the information communicated over the peer to peer traffic channel is route and/or traffic information, e.g., a suggested alternate route.

Figure 3:
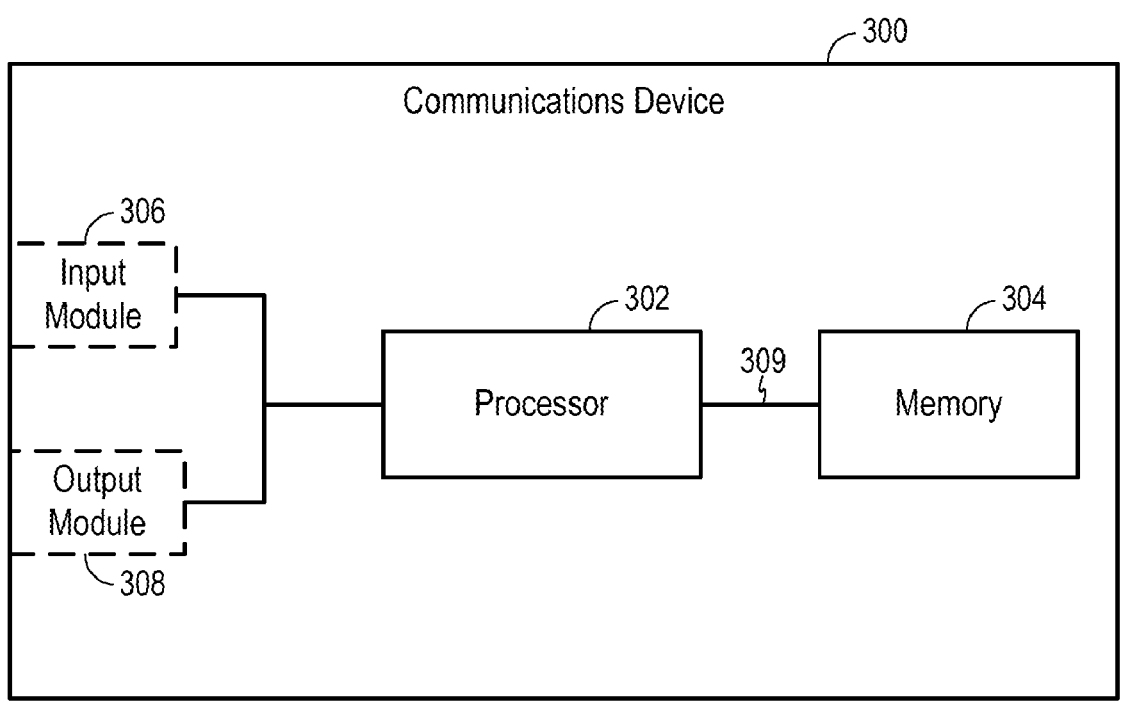
FIG. 3 is a drawing of an exemplary first communications device, in accordance with an exemplary embodiment.

FIG. 3 is a drawing of an exemplary first communications device 300, in accordance with an exemplary embodiment. Exemplary first communications device 300 is, e.g., one of the wireless communications devices (102, 104, ..., 106) of FIG. 1. Exemplary first communications device 300 may, and sometimes does, implement a method in accordance with flowchart 200 of FIG. 2.

First communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a first signal from a second communications device; generate a first application alert if said first signal satisfies an application alert criteria; and receive a second signal from an access point said second signal carrying second communications device information based on a previous signal from the second communications device. The access point may be, and sometimes is, a base station. In some embodiments, the second communications device information is location information. In various embodiments, processor 302 is configured to receiving said first signal via a wireless peer to peer interface as part of being configured to receive a first signal. In some embodiments, processor 302 is configured to receive the second signal via a wireless wide area network interface as part of being configured to receive the second signal.

Processor 302 is further configured to determine an operation to take based on the second communications device information included in the second signal and information included in said first signal. In one exemplary embodiment, said second communications device information included in the second signal is information on a previous location of said second communications device, said information included in the first signal is current location information, and said operation is one of a location based traffic update operation and a location based advertisement update operation. Processor 302, in some embodiments, is further configured to send an information request signal to the access point requesting information corresponding to the second communications device, in response to the generated first application alert.

Figure 4:
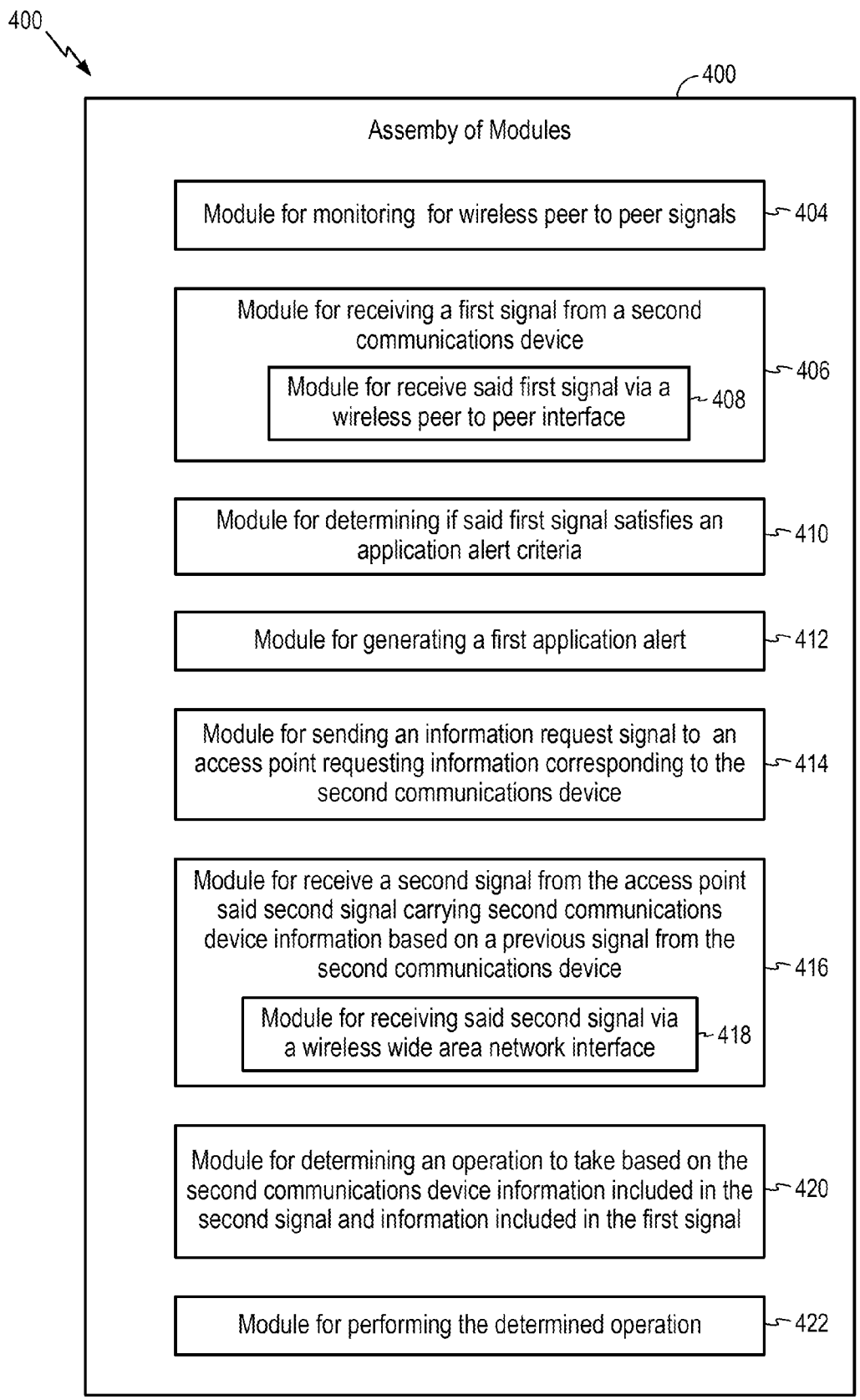
FIG. 4 is an assembly of modules which can, and in some embodiments is, used in the first communications device illustrated in FIG. 3.

FIG. 4 is an assembly of modules 400 which can, and in some embodiments is, used in the first communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the first communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of module 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the first communications device 300 or elements therein such as the processor 302, to perform the functions of the corresponding steps illustrated in the method flowchart 200 of FIG. 2.

As illustrated in FIG. 4, the assembly of modules 400 includes: a module 404 for monitoring for wireless peer to peer signals, a module 406 for receiving a first signal from a second communications device, a module 410 for determining if said first signal satisfies an application alert criteria, and a module 412 for generating a first application alert. In some embodiments, the second access point is a base station. Assembly of modules 400 further includes: a module 414 for sending an information request signal to an access point requesting information corresponding to the second communications device, a module 416 for receiving a second signal from an access point, said second signal carrying second communications device information based on a previous signal from the second communications, a module 420 for determining an operation to take based on the second communications device information included in the second signal and information included in the first signal, and a module 422 for performing the determined operation. The second communications device information is, e.g., location information and/or shopping information.

In one example, the second communications device information included in the second signal is information on a previous location of the second communications device, the information included in the first signal is current location information, and the operation is one of a location based traffic update operation and location based advertisement operation. In some embodiments, a traffic or advertisement update which is based on both the previous location and the current location is also based on the date and/or time associated with the location information. For example, a traffic update may be for an anticipated route based on a previously taken route at the same time of day. As another example, an advertisement based on both a previous location and the current location may also be based on date and/or time information associated with the location information, e.g., using previous shopping habit information.

Module 406 includes a module 408 for receiving said first signal via a wireless peer to peer interface. The wireless peer to peer interface is, e.g., an interface for direct device to device wireless communications signaling. Module 416 includes a module 418 for receiving said second signal via a wireless wide area network interface. The wireless wide area network interface is, e.g., a cellular network interface.

Figure 5:
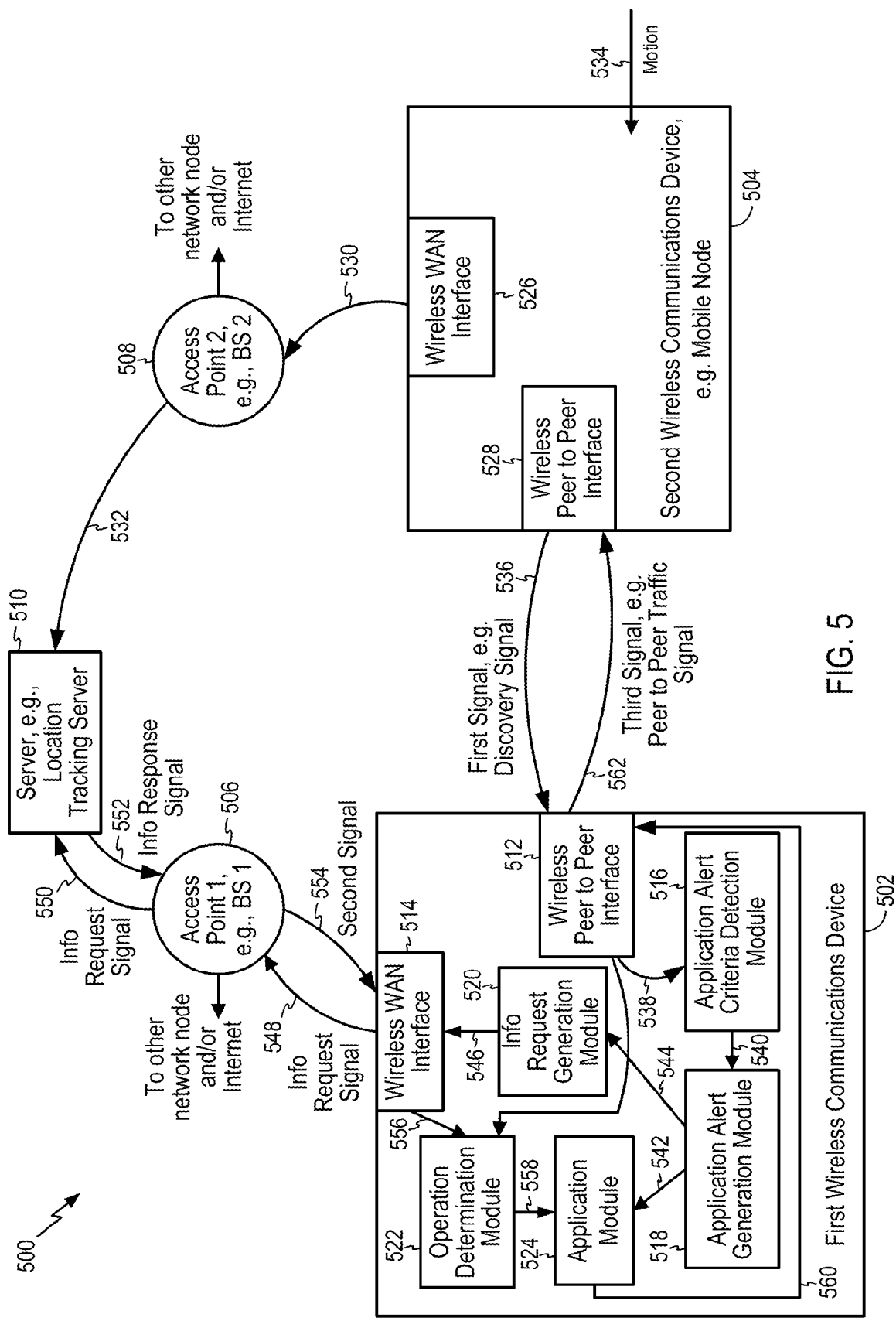
FIG. 5 is a drawing of an exemplary communications system including a first wireless communications device, a second wireless communications device, a first access point, a second access point, and a server.

FIG. 5 is a drawing of an exemplary communications system 500 including a first wireless communications device 502, a second wireless communications device 504, a first access point 506, a second access point 508, and a server 510. First wireless communications device 502, e.g., a stationary or mobile wireless communications device, includes a wireless peer to peer interface 512 and a wireless wide area network (WAN) interface 514. First wireless communications device 502 also includes an application alert criteria detection module 516, an application alert generation module 518, an information request generation module 520, an operation determination module 522, and an application module 524.

Second wireless communications device 504, e.g., a mobile node, includes a wireless WAN interface 526 and a wireless peer to peer interface 528. Second wireless communications device 504 sends a wireless wide are network signal 530, e.g., a cellular signal to access point 2 508, e.g., base station 2. In some embodiments, signal 530 includes location information regard second wireless communications device 504, e.g., a second wireless communications device GPS position fix, second device position coordinates, a street address corresponding to the location of the second device, a landmark corresponding to the location of the second device, etc. In some embodiments, signal 530 is used to derive position information regarding the position of second wireless communications device 504. For example, access point 2 508 may use signal strength measurements of reception of signal 530 and/or receiving antenna information, e.g., which sector antenna was used to receive signal 530, and/or a triangulation determination based on one or more signals from access point 2 including signal 530, to determine the approximate location of second communications device 504. Access point 2 508 transmits signal 532 to server 510, e.g., a location tracking server, communicating location information about second wireless communications device 504.

Second wireless communications device 504 is in motion as indicated by arrow 534. Second communications device 504 transmits first signal 536, e.g., a peer discovery signal, via its wireless peer to peer interface 528. Consider that the second communications device 504 is now in range of first wireless communications device 502 with regard to peer to peer discovery signal detection capability. The first wireless communications device 502 receives first signal 536 via its wireless peer to peer interface 512. First signal information is input to application alert detection module 516 as indicated by arrow 538. Further consider that the application alert detection module 516 determines that the first signal 536 has satisfied an application alert criteria. For example, the first signal 536 may have conveyed a device identifier which was being searched for by the application. As another example, the first signal 536 may have conveyed a request for a type of information, e.g., directions or a shopping request, and the application is capable of responding to the request. Arrow 540 indicates that the application alert criteria detection module 516 has determined that the application alert criteria has been satisfied; therefore, application alert generation module 518 is notified to generate an application alert.

Application alert generation module 518 generates a first application alert as indicated by arrow 542 directed to application module 524. In addition application alert generation module 518 notifies information request generation module 520 to generate an information request signal to request information, e.g., prior location information and/or prior routing information, regarding the second communications device 504, as indicated by arrow 544.

Information request generation module 520, in response to the generated first application alert generates an information request to be sent to access point 1 506, e.g., base station 1 506, requesting information corresponding to the second communications device 504. First communications device 502 sends information request signal 548 to access point 1 506 via its wireless WAN interface 514, e.g., a cellular network interface. Access point 1 506, receives information request signal 548 and generates information request signal 550 which its sends to server 510, e.g., a location tracking server. In some embodiments, information request signal 550 is a forwarded version of information request signal 548.

Server 510 retrieves stored information regarding second communications device 504, e.g., prior location information communicated in or based on signal 530. Server 510 generates and transmits information response signal 552 communicating the requested information regarding second communications device 504. Access point 1 506 receives information response signal 552 and generates second signal 554 which it transmits to first wireless communications device 502. In some embodiments, the second signal 554 is a forwarded version of information response signal 552.

First communications device 502 receives second signal 554 via its wireless WAN interface 514. The second signal carries second communications device information based on a previous signal from the second communications device. For example, the second signal carries location information based on signal 530 from the second communications device. As another example, the second signal carries shopping preference information of the second communications device.

Operation determination module 522 receives information included in the second signal 554 as indicated by arrow 556 and information included in the first signal 536 as indicated by arrow 552. The operation determination module 522 determines an operation to take based on the second communications device information included in the second signal and information included in the first signal.

In this example the operation determination module 522 notifies to application module 558 to take action as indicated by arrow 558. The application module 558 implements an operation, e.g., generating and/or communicating a traffic report to the second communications device 504 via its wireless peer to peer interface 512 or generating and/or communicating advertisement information via its peer to peer interface 512. Arrow 560 indicates that the application module 524 generates a third signal to be communicated to the second communications device 504 via wireless peer to peer interface 512, e.g., over a peer to peer traffic channel. Arrow 562 indicates that the third signal 562 is transmitted via wireless peer to peer interface 512 of first communications device 502 to wireless peer to peer interface 528 of second communications device 504.

In one example, the second communications device information included in the second signal is information on a previous location of the second communications device 504, and the information included in the first signal is second device identification information, and the operation is one of a location based traffic update operation and a location based advertisement update operation. In one example, the second communications device information included in the second signal is information on a previous location of the second communications device 504, and the information included in the first signal is current location information, and the operation is one of a location based traffic update operation and a location based advertisement update operation.

In another example, the second communications device information included in the second signal is information on a previous location of the second communications device 504, and current location information of the second communications device is derived from and/or based on detection of the first signal, and the operation is one of a location based traffic update operation and a location based advertisement update operation. For example, in one situation where the first wireless communications device is stationary or at a known location, the presence and/or strength of detected peer to peer signal 536 may be used to estimate the current position of second communications device 504.

In this example of FIG. 5, the first communications device 502 sends request information signal 548, and second signal 554 is received in response to the request. In some embodiments, the access point 506 transmits, e.g., periodically, information about the second communications device 504 without having to receive request information signal 548, and second signal 554 is one of those transmissions which has been received by wireless WAN interface 514.

In some embodiments, the information communicated via the second signal 554 has not been retrieved from a server node such as node 510 but has been communicated via access points. In some embodiments at some times, the access point which receives signal 530 is the same access point which transmits signal 554.

In one exemplary embodiment first communications device 502 of FIG. 5 is first communications device 300 of FIG. 3, and modules (516, 518, 520, 522, 524) of FIG. 5 are modules (406, 412, 414, 420, 422) of assembly of modules 400 of FIG. 4, respectively. In some embodiments, the first communications device 502 includes the composite of the modules shown in FIG. 5 and additional modules of the assembly of modules 400 of FIG. 4.

Figure 6:
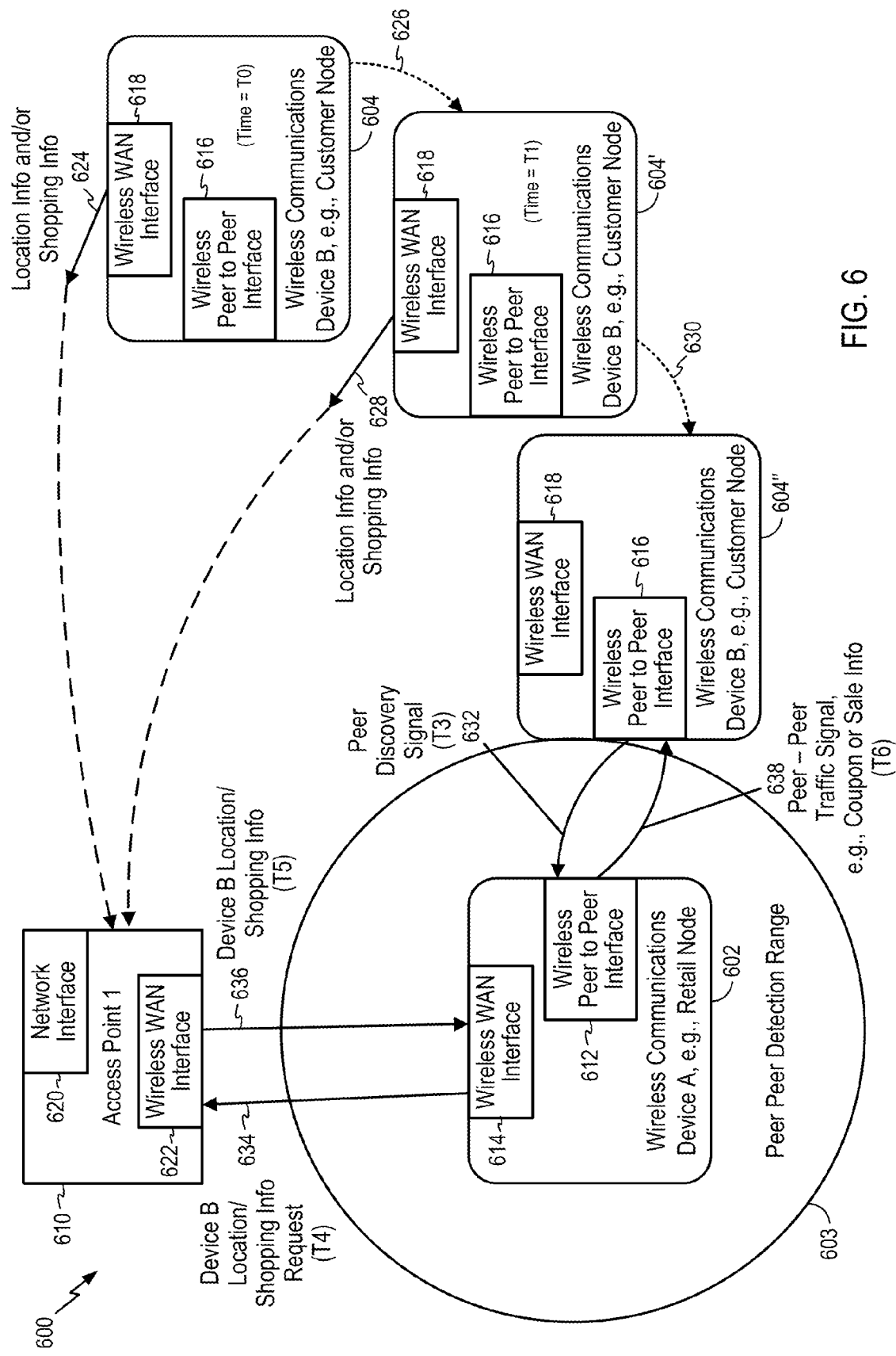
FIG. 6 is used to illustrate an example related to retailing activity in which an exemplary wireless communications device uses a combination of information received via a peer to peer interface and information received via a wide area network interface, to generate targeted advertisement related information to be communicated to a potential customer.

FIG. 6 is a drawing of an exemplary communications system 600 including a plurality wireless communications devices with wireless peer to peer and wireless wide area network interfaces and at least one access point. FIG. 6 is used to illustrate an example related to retailing activity in which an exemplary wireless communications device uses a combination of information received via a peer to peer interface and information received via a wide are network interface, e.g., to generate information to be communicated to a potential customer.

Communications system 600 includes wireless communications device A 602, wireless communications device B 604 and access point 1 610. Wireless communications device A 602 is, e.g., a retail node, while wireless communications device B 604 is, e.g. a customer node. Communications device A 602 is, e.g., any of the wireless communications devices of FIG. 1, a wireless communications device implementing a method in accordance with flowchart 200 of FIG. 2, first wireless communications device 300 of FIG. 3 and/or first wireless communication device 502 of FIG. 5. Wireless communications device A 602 includes a wireless peer to peer interface 612 and a wireless WAN interface 614. Wireless communications device A 602 has a peer to peer detection range as indicated by circle 603. Wireless communications device B 604 includes a wireless peer to peer interface 616 and a wireless WAN interface 618. Element 604' is a representation of wireless communications device B 604 at time T1, which is a later time than time T0, and at a different location from its location at time T0. Element 604" is another representation of wireless communications device B 604 at a still later time and another different location. Access point 1 610, e.g., a base station, includes a wireless WAN interface 622 and a network interface 620.

Wireless communications device B 604 determines location information and/or shopping information corresponding to time T0, generates signal 624 communicating location information and/or shopping information, and transmits the generated signal 624 over its wireless WAN interface 618. Location information communicated in signal 624 is, e.g., location coordinates of wireless communications device B 604 at time T0. Shopping information communicated in signal 624 is, e.g., shopping preference information of the customer of node B 604 at time T0. The information communicated in signal 624 reaches access node 1 610. It may be received via network interface 620 or via wireless WAN interface 622 of access node 1 610 depending upon the path, e.g., depending upon whether another intermediate node is involved. The information being communicated in signal 624 can be, and sometimes is, forwarded via other network nodes in a backhaul network, e.g., another access node and/or a server node in which case the information of signal 624 is received via network interface 620. Alternatively, access point 1 610 may be serving as the current access point for wireless communications device B 604 in which case signal 624 is received via wireless WAN interface 622 of access point 1 610. In some embodiments, information in signal 624 may be collected and/or processed at a server node, e.g., a location tracking server node or a shopping server node, which collects information and/or processes information corresponding to many wireless communications devices registered with the wide area network.

In this example, consider that wireless communications devices which are registered with the wide area network transmit, e.g., periodically transmit, location information and/or shopping information over its wireless wide area network interface. Wireless communications device B 604 moves to a new location as indicated by arrow 626. Wireless communications device B 604 determines location information and/or shopping information corresponding to time Ti, generates signal 628 communicating new location information and/or shopping information, and transmits the generated signal 628 over its wireless WAN interface. The information communicated in signal 628 reaches access point 1 610.

Wireless communications device B 604 moves to another location as indicated by arrow 630. In some embodiments, device A 602 and device B 604 are participating in peer discovery, e.g., at predetermines times in accordance with a peer to peer timing structure, devices (602, 604) advertise their presence and also listen for, e.g., receive, other peer' discovery signals. Consider that the peer discovery range is limited. Further consider that wireless communications device B 604 is now within the peer to peer detection range of wireless communications device A 602. Peer discovery signal 632 transmitted at time T3 by wireless communications device B 604 via its wireless peer to peer interface 616 is received by wireless communications device A 602 via its wireless peer to peer interface 612. Since device B 604 is in the vicinity of device A 602, device A 602 is able to decode the peer discovery signal 632 transmitted by device B 604. An application on device A 602 receives a message corresponding to the decoded peer discovery signal 632 from device B 604. The application can then trigger a signal to be transmitted to access point 1 610, requesting further information about the newly discovered device B 604. Wireless communications device A 602 generates and transmits signal 634 at time T4 via wireless WAN interface 614 to access point 1 610. Signal 634 requests information regarding the past locations and/or past shopping information about wireless communications device B 604.

Access point 1 610 receives signal 634 via its wireless WAN interface 622 and generates and transmits a response signal 636, which it transmits at time T5 via its wireless WAN interface 622 to device A 602. Wireless communications device A 602 receives signal 636 via its wireless WAN interface 614. Response signal 636 includes device B locations and/or shopping information corresponding to prior times.

As an alternative approach access point 1 610 transmits, e.g., periodically transmits, location and/or shopping information about device B 604 without having to be requested, and device A 602 recovers such information when it is of interest.

The received information of signal 636, e.g., received request response information about device B, can trigger another message to the application running in device A 602 to process the obtained information. Device A 602 can use the received information from signal 636 to generate targeted advertisement information to communicate to device B 604. For example, device A 602 can cross reference the past locations of device B 604 with a database of retail stores of the same type or another in the vicinity of those past locations along with any coupon or sale information pertaining to the stores for which device B 604 has previously expressed an interest. Then device A 602 can generate a custom targeted advertisement message for device B 604.

Wireless communications device A 602 generates and transmits, at time T6, peer to peer traffic signal 638 including the generated targeted advertising information via its peer to peer interface 612. The peer to peer traffic signal 638 includes, e.g. a coupon and/or sale information that is expected to be of interest to communications device B 604, e.g. information so that the customer of device B 604 can find the best deals on items sold in stores of interest. The peer to peer traffic signal 638, in some embodiments, is communicated using peer to peer traffic channel air link resources of a recurring peer to peer timing structure. Wireless communications device B 604 receives signal 638 and recovers the targeted advertisement information being communicated.

Figure 7:
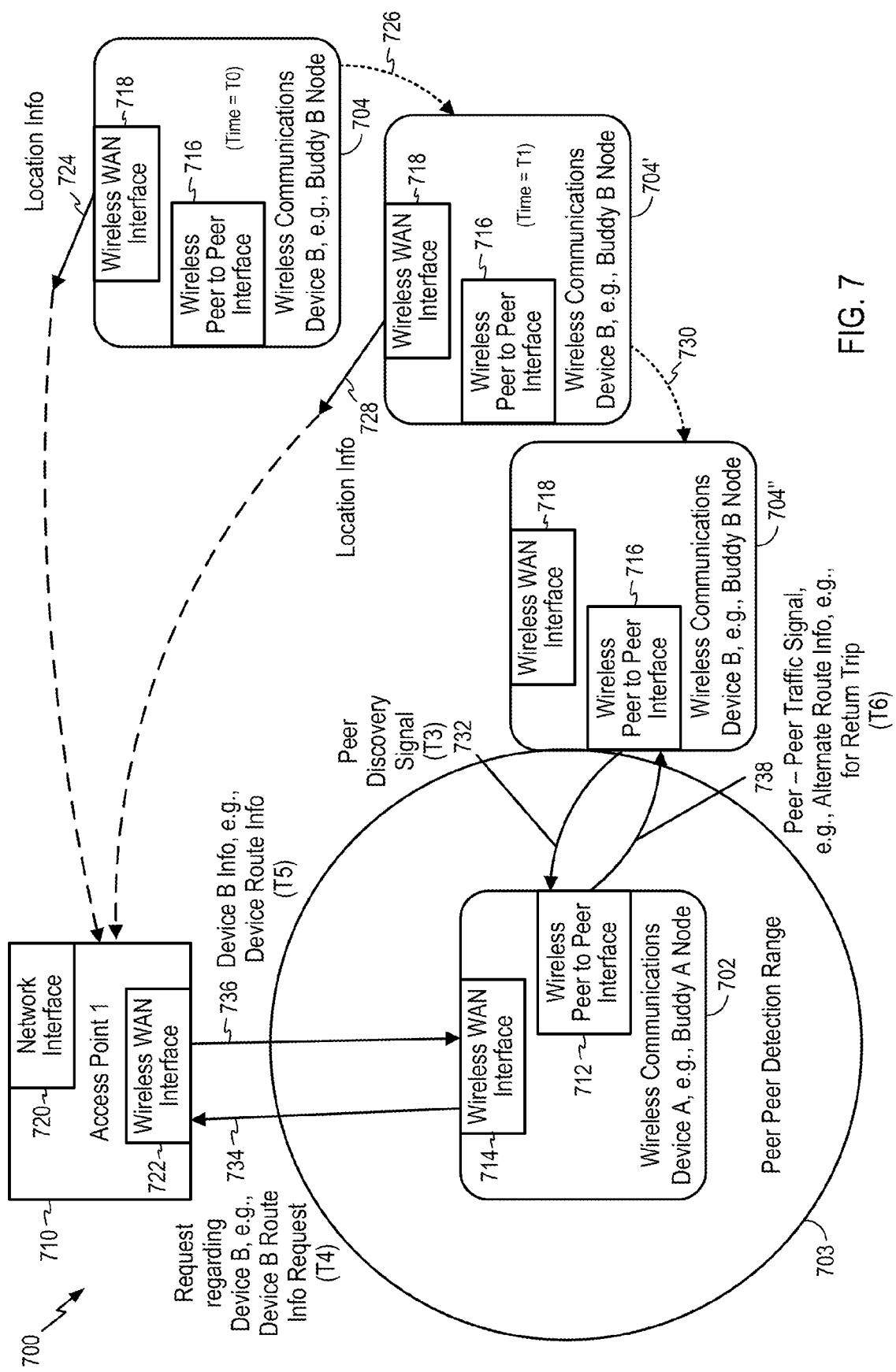
FIG. 7 is used to illustrate an example related to routing and/or traffic information in which an exemplary wireless communications device uses a combination of information received via a peer to peer interface and information received via a wide area network interface to generate targeted routing and/or traffic related information to be communicated to another communications device.

FIG. 7 is a drawing of an exemplary communications system 700 including a plurality wireless communications devices with wireless peer to peer and wireless wide area network interfaces and at least one access point. FIG. 7 is used to illustrate an example related to routing and/or traffic information in which an exemplary wireless communications device uses a combination of information received via a peer to peer interface and information received via a wide are network interface, e.g., to generate information to be communicated to another communications device.

Communications system 700 includes wireless communications device A 702, wireless communications device B 704 and access point 1 710. Wireless communications device 1 702 is, e.g., buddy A's communications device, while wireless communications device B 704 is, e.g., buddy B's communications device. Communications device A 702 is e.g., any of the wireless communications device of FIG. 1, a wireless communications device implementing a method in accordance with flowchart 200 of FIG. 2, first wireless communications device 300 of FIG. 3 and/or first wireless communication device 502 of FIG. 5. Wireless communications device A 702 includes a wireless peer to peer interface 712 and a wireless WAN interface 714. Wireless communications device A 702 has a peer to peer detection range as indicated by circle 703. Wireless communications device B 704 includes a wireless peer to peer interface 716 and a wireless WAN interface 718. Element 704' is a representation of wireless communications device B 704 at time T1, which is a later time than time T0, and at a different location from its location at time T0. Element 704" is another representation of wireless communications device B 704 at a still later time and another different location. Access point 1 710, e.g., a base station, includes a wireless WAN interface 722 and a network interface 720.

Wireless communications device B 704 determines location information corresponding to time T0, generates signal 724 communicating location information, and transmits the generated signal 724 over its wireless WAN interface 718. Location information communicated in signal 724 is, e.g., location coordinates of wireless communications device B 704 at time T0. The information communicated in signal 724 reaches access node 1 710. It may be received via network interface 720 or via wireless WAN interface 722 of access node 1 710 depending upon the path, e.g., depending upon whether another intermediate node is involved. The information being communicated in signal 724 can be, and sometimes is, forwarded via other network nodes in a backhaul network, e.g., another access node and/or a server node in which case the information of signal 724 is received via network interface 720. Alternatively, access point 1 710 may be serving as the current access point for wireless communications device B 704 in which case signal 724 is received via wireless WAN interface 722 of access point 1 710. In some embodiments, information in signal 724 may be collected and/or processed at a server node, e.g., a location tracking server node, which collects information and/or processes information corresponding to many wireless communications devices registered with the wide area network.

In this example, consider that wireless communications devices which are registered with the wide area network transmit, e.g., periodically transmit, location information over its wireless wide area network interface. Wireless communications device B 704 moves to a new location as indicated by arrow 726. Wireless communications device B 704 determines location information corresponding to time T1, generates signal 728 communicating new location information, and transmits the generated signal 728 over its wireless WAN interface. The information communicated in signal 728 reaches access point 1 710.

Wireless communications device B 704 moves to another location as indicated by arrow 730. In some embodiments, device A 702 and device B 704 are participating in peer discovery, e.g., at predetermines times in accordance with a peer to peer timing structure, devices (702, 704) advertise their presence and also listen for, e.g., receive, other peer' discovery signals. Consider that the peer discovery range is limited. Further consider that wireless communications device B 704 is now within the peer to peer detection range of wireless communications device A 702. Peer discovery signal 732 transmitted at time T3 by wireless communications device B 704 via its wireless peer to peer interface 716 is received by wireless communications device A 702 via its wireless peer to peer interface 712. Since device B 704 is in the vicinity of device A 702, device A 702 is able to decode the peer discovery signal 732 transmitted by device B 704. An application on device A 702 receives a message corresponding to the decoded peer discovery signal 732 from device B 704. The application can then trigger a signal to be transmitted to access point 1 710, requesting further information about the newly discovered device B 704. Wireless communications device A 702 generates and transmits signal 734 at time T4 via wireless WAN interface 714 to access point 1 710. Signal 734 requests information regarding the past locations, past route, and/or intended destination target about wireless communications device B 604.

Access point 1 710 receives signal 734 via its wireless WAN interface 722 and generates and transmits a response signal 736, which it transmits at time T5 via its wireless WAN interface 722 to device A 702. Wireless communications device A 702 receives signal 736 via its wireless WAN interface 712. Response signal 736 includes device B past locations, past routing, and/or intended destination.

As an alternative approach access point 1 710 transmits, e.g., periodically transmits, location information about device B 704 without having to be requested, and device A 702 recovers such information when it is of interest.

The received information of signal 736, e.g., received request response information about device B, can trigger another message to the application running in device A 702 to process the obtained information. Device A 702 can use the received information from signal 736 to generate targeted route information to communicate to device B 704. For example, the information in signal 736 may indicate the route that device B 704 took to reach device A 702, and device A 702 may use that received information to suggest an alternate route, e.g., an alternate return route. Then device A 702 can generate a custom targeted suggested routing message for device B 704.

Wireless communications device A 702 generates and transmits, at time T6, peer to peer traffic signal 738 including the generated alternate route information via its peer to peer interface 712. The peer to peer traffic signal 738 includes, e.g. a suggested return route for communications device B 704, e.g. a more efficient route based on current traffic conditions. The peer to peer traffic signal 738, in some embodiments, is communicated using peer to peer traffic channel air link resources of a recurring peer to peer timing structure. Wireless communications device B 704 receives signal 738 and recovers the suggested alternate route information being communicated.

As another example, wireless communications device A 702, may be a traffic reporting service node situated at a strategic location, e.g., a traffic choke point, and communications device B 702 may be a communications device of a driver. Location information signals 724 and 728 may be used to determine device B's route, e.g., approaching peer to peer detection range 703 on westbound highway A or approaching peer to peer detection range on westbound highway B. Detection of peer discovery signal 732 by device A 702 may be used to trigger recovery of past location information and/or past route information about device B 704 and suggest a best route in view of current conditions. In some embodiments, the peer discovery signal may also communicate current location information of device B 704. In some embodiments, information derived from received peer discovery signal 732, e.g., signal strength information and/or information identifying a direction from which the received signal was transmitted, is also used by device A 702 in generating a peer to peer traffic signal 738. Generated peer to peer traffic signal 738 may suggest a best route to continue on among a plurality of potential alternates based on current traffic conditions, e.g., stay on current highway, switch to alternate parallel highway, take a particular bridge crossing, take a particular tunnel crossing, etc.

Figure 8:
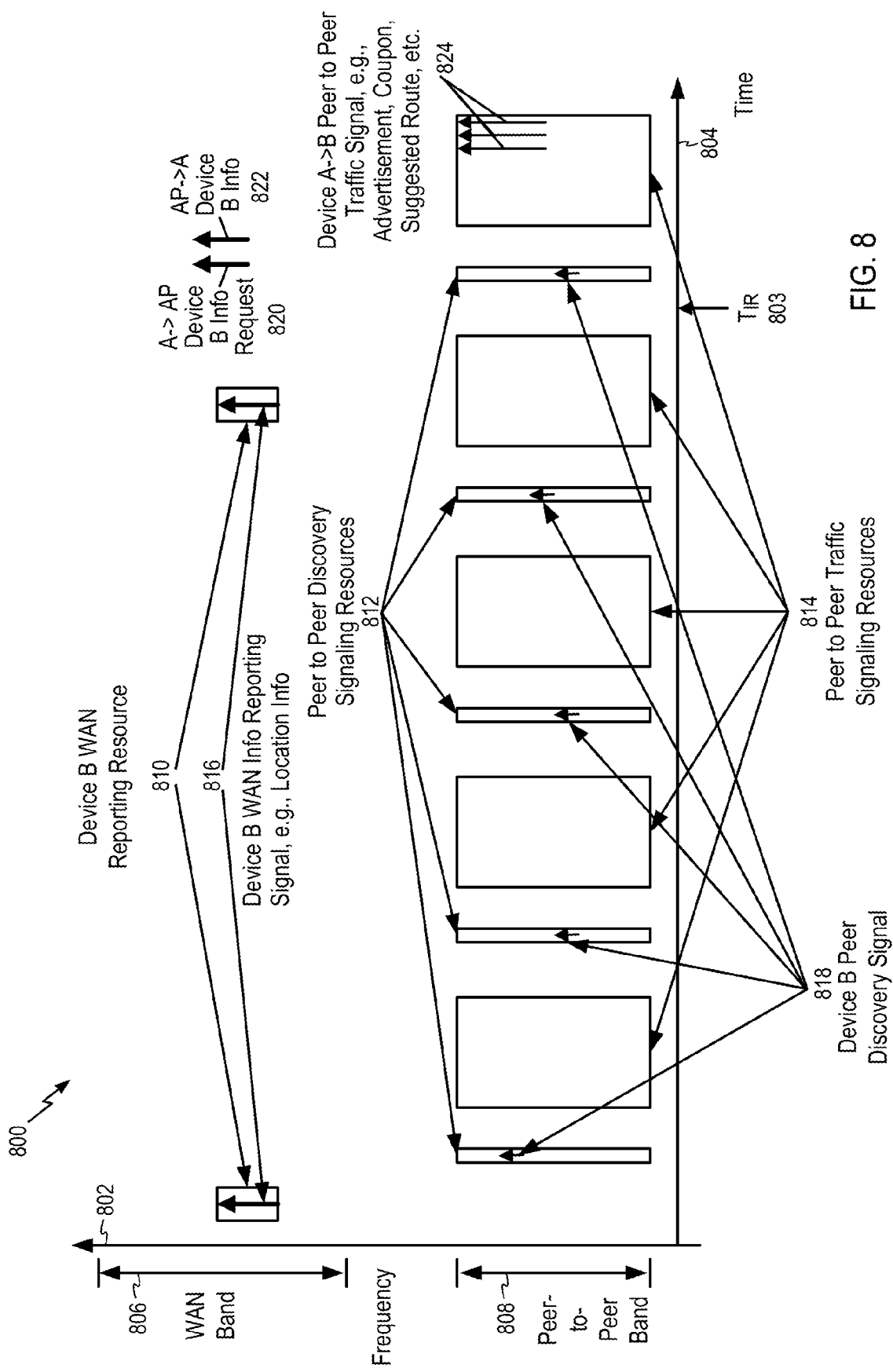
FIG. 8 is a drawing illustrating exemplary timing structure information and exemplary signaling in a communications system in which a wireless communications device including a wide area network interface and a peer to peer interface uses information received over both interfaces to generate user targeted information.

FIG. 8 is a drawing 800 illustrating exemplary timing structure information and exemplary signaling in a communications system in which a wireless communications device including a wide area network interface and a peer to peer interface uses information received over both interfaces to generate user targeted information. Drawing 800 includes a vertical axis 802 representing frequency and a horizontal axis 804 representing time. The available frequency spectrum includes a wide area network band 806, e.g., for cellular network communications, and a peer to peer band 808 for peer to peer network communications. In some embodiments, the cellular network uses one of a CDMA based signaling protocol and a GSM based signaling protocol, while the peer to peer network uses an OFDM based signaling protocol. In some embodiments, the peer to peer communications network is a decentralized ad hoc type of network. In some embodiments, the maximum wireless communications range in the peer to peer to peer network is less than the maximum wireless communications range in the WAN network.

The WAN timing and frequency structure includes device B reporting resources 810 which are used to carry device B WAN information reporting signals 816. For example, the device B reporting signals 816, which are generated and transmitted by device B, communicate, in some embodiments, location information and/or shopping related information about device B.

The peer to peer band timing and frequency structure includes peer to peer discovery signaling resources 812 and peer to peer traffic signaling resources 814.

Consider an example; wireless communications device B periodically reports location and/or shopping information through its WAN interface as indicated by signals 816. Wireless communications device B is also participating in peer discovery. Wireless communications device B is allowed to use a portion of the peer discovery resources 812 to transmit its peer discovery signal 818. Consider that device A is monitoring for device B peer discovery signals; however, at first device B is out of range of device A, so its does not detect the device B peer discovery signal. However, at time $T_{IR}$ 803 device B is within peer discovery range of device A. Then the next peer discovery signal from device B is detected and recovered by device B. In response to the detected peer discovery signal, device A sends, to its point of network attachment which is its current access node, information request signal 820 requesting information, e.g., requesting location related information and/or shopping related information, about device B. The access point responds with signal 822 which communicates past information, e.g. past location information, routing information and/or shopping information about device B.

Device A processes the received information communicated in signal 822 and generates targeted information to be communicated to device B through the peer to peer network using a portion of the peer to peer traffic signaling resources, e.g., a peer to peer traffic channel segment. Device A generates and transmits peer to peer traffic signal 824, e.g., an advertisement, coupon, suggested route, or traffic report, to device B.

In one example where FIG. 8 is viewed as corresponding to FIG. 6, device A of FIG. 8 is device A 602 of FIG. 8, device B of FIG. 8 is device B 604 of FIG. 6, signals 816 of FIG. 8 correspond to signal 624 and signal 628 of FIG. 6 which occur at different times. In addition, peer discovery signal 632 of FIG. 6 is device B peer discovery signal 818 following time $T_{IR}$ 803, information request signal 820 of FIG. 8 is information request signal 634 of FIG. 6, information signal 822 of FIG. 8 is information signal 636 of FIG. 6, and peer to peer traffic signal 824 of FIG. 8 is peer to peer traffic signal 638 of FIG. 6.

In another example where FIG. 8 is viewed as corresponding to FIG. 7, device A of FIG. 8 is device A 702 of FIG. 8, device B of FIG. 8 is device B 704 of FIG. 7, signals 816 of FIG. 8 correspond to signal 724 and signal 728 of FIG. 7 which occur at different times. In addition, peer discovery signal 732 of FIG. 7 is device B peer discovery signal 818 following time $T_{IR}$ 803, information request signal 820 of FIG. 8 is information request signal 734 of FIG. 7, information signal 822 of FIG. 8 is information signal 736 of FIG. 7, and peer to peer traffic signal 824 of FIG. 8 is peer to peer traffic signal 738 of FIG. 7.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., stationary wireless nodes, mobile nodes such as mobile access terminals of which cell phones are but one example, base stations including one or more attachment points, servers, and/or communications systems. Various embodiments are also directed to methods, e.g., method of controlling and/or operating wireless communications devices including mobile and/or stationary nodes, base stations, server nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving a first signal from a second communications device; generating a first application alert if said first signal satisfies an application alert criteria; receiving a second signal from an access point said second signal carrying second communications device information based on a previous signal from the second communications device, etc.

Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While various features are described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), GSM and/or various other types of communications techniques which may be used to provide wireless communications links, e.g., WAN wireless communications links, between access points and wireless communications device such as mobile nodes and wireless communications. The methods and apparatus may be, and in various embodiments are, used with CDMA, orthogonal frequency division multiplexing (OFDM), GSM and/or various other types of communications techniques which may be used to provide wireless communications links, e.g., direct peer to peer wireless communications links, between wireless communications devices including peer to peer interfaces. In some embodiments a wireless communications device including both a wide area network interface and a peer to peer network interface uses different communications techniques for the different interfaces, e.g., one of CDMA and GSM based techniques for the WAN interface and OFDM based techniques for the peer to peer interface. In some embodiments the access points are implemented as base stations which establish communications links with mobile nodes using CDMA, GSM and/or OFDM. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device, the method comprising:
   receiving a first signal from a second communications device, said first signal being a peer to peer signal;
   receiving a second signal from an access point, said second signal carrying second communications device information based on a signal from the second communications device, said second signal being a wide area network signal; and
   performing an operation based on said second communication device information in said second signal and information in said first signal.

2. The method of claim 1, wherein said second communications device information is location information.

3. The method of claim 1, wherein receiving a first signal includes receiving said first signal via a wireless peer to peer interface.

4. The method of claim 3, wherein receiving the second signal includes receiving the second signal via a wireless wide area network interface.

5. The method of claim 1, further comprising:
   determining an operation to take based on the second communications device information included in the second signal and information included in said first signal.

6. The method of claim 5,
   wherein said second communications device information included in the second signal is information on a previous location of said second communications device;
   wherein said information included in the first signal is current location information; and
   wherein said operation is one of a location based traffic update operation and a location based advertisement update operation.

7. The method of claim 1, further comprising:
   in response to the generated first application alert, sending an information request signal to the access point requesting information corresponding to the second communications device.

8. The method of claim 1, wherein the access point is a base station.

9. The method of claim 1 further comprising:
   generating a first application alert if said first signal satisfies an application alert criteria.

10. A first communications device comprising:
    means for receiving a first signal from a second communications device, said first signal being a peer to peer signal;
    means for receiving a second signal from an access point, said second signal carrying second communications device information based on a signal from the second communications device, said second signal being a wide area network signal; and
    means for performing an operation based on said second communication device information in said second signal and information in said first signal.

11. The first communications device of claim 10, wherein said means for receiving a first signal includes means for receiving said first signal via a wireless peer to peer interface.

12. The first communications device of claim 11, wherein said means for receiving the second signal includes means for receiving the second signal via a wireless wide area network interface.

13. The first communications device of claim 10, further comprising:
    means for determining an operation to take based on the second communications device information included in the second signal and information included in said first signal.

14. The first communications device of claim 13,
    wherein said second communications device information included in the second signal is information on a previous location of said second communications device;
    wherein said information included in the first signal is current location information; and
    wherein said operation is one of a location based traffic update operation and a location based advertisement update operation.

15. The first communications device of claim 10, further comprising:
    means for sending an information request signal to the access point requesting information corresponding to the second communications device, in response to the generated first application alert.

16. The first communications device of claim 10, further comprising a device, selected from the group consisting of a set top box, music player, video player, entertainment unit, navigation device, communications device, personal digital assistant (PDA), fixed location data unit, and a computer, into which the device is integrated.

17. A computer program product for use in a first communications device, the computer program product comprising:
    a non-transitory computer readable medium comprising:
    code for causing at least one computer to receive a first signal from a second communications device, said first signal being a peer to peer signal;
    code for causing said at least one computer to receive a second signal from an access point, said second signal carrying second communications device information based on a previous signal from the second communications device, said second signal being a wide area network signal;

code for performing an operation based on said second communication device information in said second signal and information in said first signal.

18. A first communications device comprising:

at least one processor configured to:

receive a first signal from a second communications device said first signal being a peer to peer signal;

receive a second signal from an access point, said second signal carrying second communications device information based on a previous signal from the second communications device;

perform an operation based on said second communication device information in said second signal and information in said first signal and memory coupled to said at least one processor.

19. The first communications device of claim 18, wherein said at least one processor is configured to receive said first signal via a wireless peer to peer interface as part of being configured to receive a first signal.

20. The first communications device of claim 19, wherein said at least one processor is configured to receive the second signal via a wireless wide area network interface as part of being configured to receive the second signal.

21. The first communications device of claim 18, wherein said at least one processor is further configured to: determine an operation to take based on the second communications device information included in the second signal and information included in said first signal.

22. The first communications device of claim 21, wherein said second communications device information included in the second signal is information on a previous location of said second communications device;

wherein said information included in the first signal is current location information; and wherein said operation is one of a location based traffic update operation and a location based advertisement update operation.

* * * * *